(No Model.) 2 Sheets—Sheet 1.
A. MORRITT.
APPARATUS FOR USE IN STAGE ILLUSIONS.
No. 495,052. Patented Apr. 11, 1893.
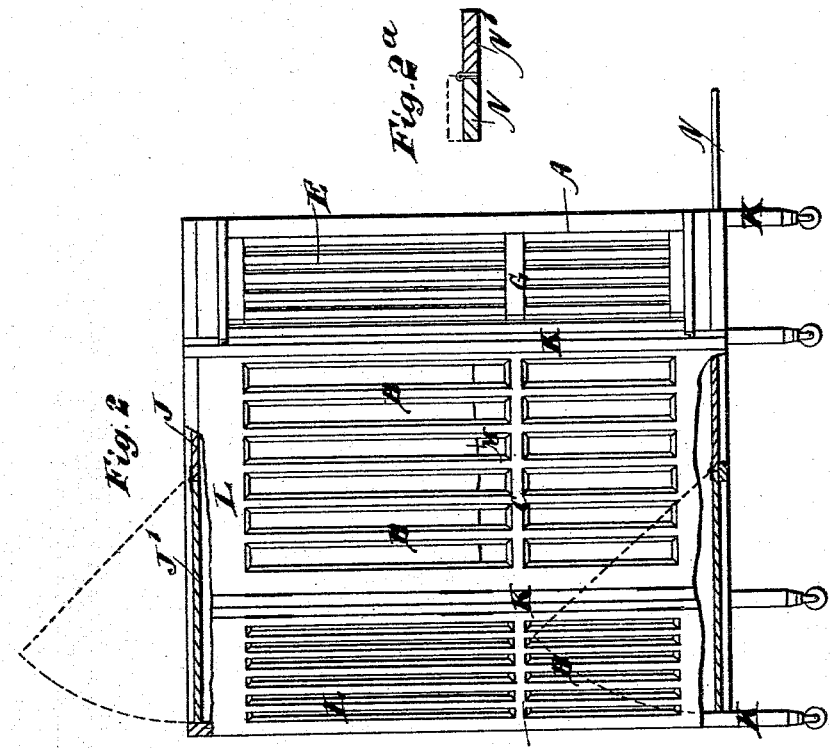
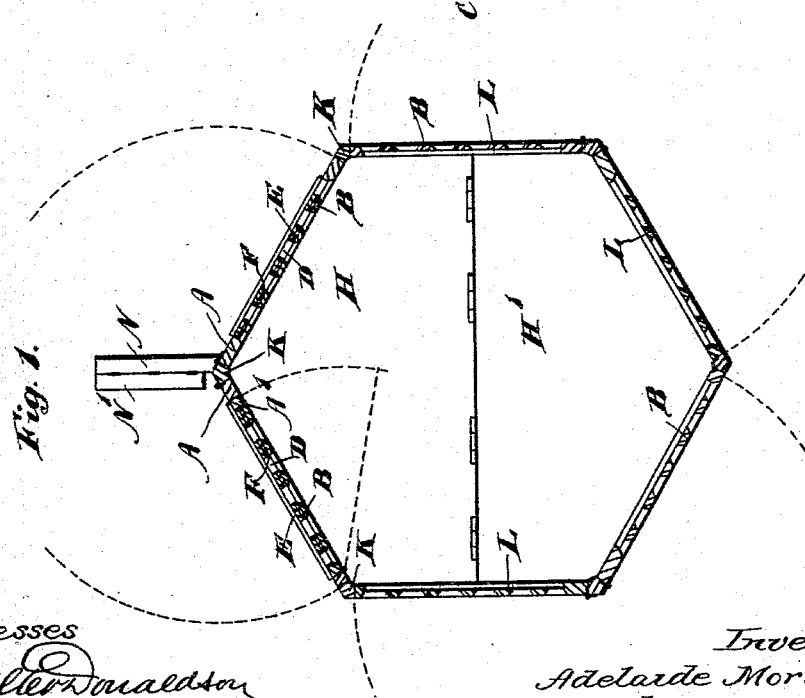
Witnesses
Walter Donaldson
F. L. Middleton
Inventor
Adelaide Morritt
by George Henry Rayner
her Attorney (No Model.) 2 Sheets—Sheet 2.
A. MORRITT.
APPARATUS FOR USE IN STAGE ILLUSIONS.
No. 495,052. Patented Apr. 11, 1893.
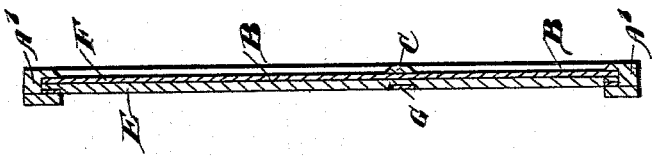
 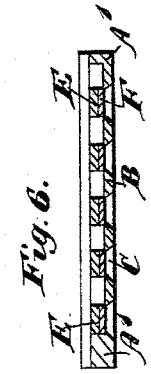 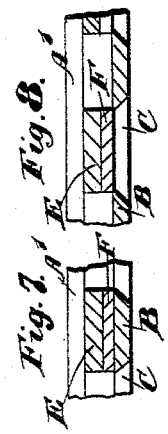
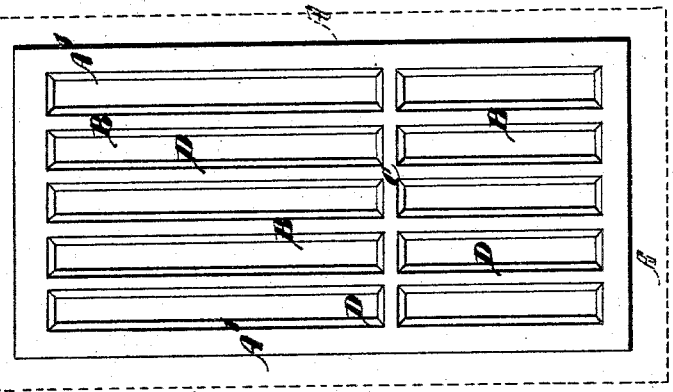
Witnesses.
James Miller
Albert Edward Ellen
Inventor.
Adelaide Morritt
by,
George Henry Rayner.
her Attorney.

UNITED STATES PATENT OFFICE.

ADELAIDE MORRITT, OF LONDON, ENGLAND.

APPARATUS FOR USE IN STAGE-ILLUSIONS.

SPECIFICATION forming part of Letters Patent No. 495,052, dated April 11, 1893.

Application filed August 23, 1892. Serial No. 443,854. (No model.)

*To all whom it may concern:*

Be it known that I, ADELAIDE MORRITT, a subject of the Queen of Great Britain and Ireland, residing at 39 Brewers Street, Regent Street, London, England, have invented a certain new and useful Improvement in Improved Apparatus for Use in Stage-Illusions and the Like, of which the following is a specification.

This invention relates to improved apparatus for use in stage illusions and the like, and consists in a novel construction of cabinet, with perforated framework and doors, and moving shutters of the same form as the doors, so arranged that when this shutter is in one position it is entirely hidden by the framework or doors, but when slid forward, it fully occupies the perforated portions. The front of this shutter is covered with a mirror, so that it is very difficult to distinguish by the eye when the framework is perfectly open, and when the mirrored shutter is closed and occupies the place of the open spaces. The framework can be placed at such an angle, with respect to an object, that when a similar object is really exposed to view through the open framework, the reflection of the first mentioned object will appear in a similar position upon the mirrors, when the shutter is thrown forward to cover the open space or spaces. The apparatus in which this arrangement is used, is constructed of six or other convenient number of doors or sides, arranged in pairs, hinged together, or hinged to the same part. Each of these doors is made with open paneling, the two back ones only being provided with the mirrored shutter. Thus each side can be thrown open, exposing the interior fully to view, and when the mirrors are shot back, allowing full view through the back. Curtains are provided for each of the sides, excepting the shuttered one, so that when desired, the interior can be hidden completely. A metal bar extends from the back at the level of the floor, which can be slid forward, when not required, flush with the floor. This bar serves as a stand onto which a person may step, when he is required to disappear from the cabinet. To enable this to be done readily, one of the back doors is provided with a second door, let into the framing in such a way as will not be noticeable at a distance. This inner door contains the shutter arrangement, and is hinged at the opposite side to the hinge of the main door, opening inward. When the figure is to disappear, the curtains are drawn down and the person opens the inner door and steps out on to the bar, closing the shutters and the door. The curtains are then raised and the doors thrown wide open, the two back doors covering the figure, though apparently open as before, the cabinet thus appearing empty.

The cabinet is raised some distance from the floor, on legs with casters, so that the audience can see under it, and is provided with both ceiling and floor, one half or a suitable part of which may be hinged to the other, so that they may be lifted, showing that there is nothing hidden by either ceiling or floor.

In order that this invention may be more clearly understood, reference is had to the accompanying sheets of illustrative drawings in which Figures 1 and 2 are respectively a sectional plan and a side elevation of the complete apparatus; Fig. 2$^a$, a detail view of the supporting bar; Figs. 3 and 4 a front elevation and a vertical section of the door; Figs. 5 and 6 cross sections of the same, and Figs. 7 and 8 detail views to a larger scale of the shutter and frame, showing the former in its closed and open positions.

A, A, are the two back gates or doors, both hinged to the same part, one of which carries the inner door A', hinged as shown to open inward, being fastened by any suitable catch. This inner door and the other back gate are formed with upright stiles B and a rail C, chamfered on each side of the paneling, forming open spaces D of the same width as, or a little less than, the stiles. Behind this frame is situated the shutter, similarly formed of vertical stiles E, the front of each being covered with a mirror F, equal in width to the openings. This shutter slides to and fro in grooves in the top and bottom rails of the framing, as shown in Fig. 4, and is arranged to slide into either of two positions, one behind the spaces in the frame and closing them, and the other behind the front stiles, leaving the spaces open, stops limiting the motion. The stiles E are connected together at top and bottom, and, if desired, at other points, by the horizontal bars G, shown in Figs. 2 and 4. The mirrors may, if desired, be used without backing, connected together by cross rails.

Figs. 5 and 7 show the shutters hidden and the spaces open, and Figs. 6 and 8 show the closed position. Square framing and rectangular perforations are shown, but it is obvious that the framing may be curved or of any ornamental pattern, if desired.

H is the floor and J the ceiling of the cabinet, one part of each H' and J' being hinged to the other, and capable of lifting up or opening as shown in Fig. 2. These are supported by vertical posts K, provided with casters, in order to allow of the cabinet moving readily, and raising the whole above the floor about one foot. The gates A and L are hinged to alternate posts, opening front to front. The gates L are provided with the vertical stiles B and rail C, with openings similar to those in the gates A, but without the mirrored shutter, spring roller blinds M being provided behind the gates, capable of extending to the bottom, thereby entirely shutting the interior of the cabinet from view.

N is the sliding bar, projecting from the back of the cabinet when required, and provided as shown in Fig. 2ª with a second piece N' hinged to it, which can be turned over to form a wider support.

What I claim as my invention, and desire to secure by Letters Patent, is—

1. In a cabinet or cage, for use in stage illusions and the like, a perforated screen or gate and a sliding mirrored shutter fitted thereto, substantially as described.

2. In a cabinet or cage for use in stage illusions and the like, the combination of a floor H, upright posts K, to some of which the gates L and A are hinged, the two back gates A being provided with mirrored shutters, arranged to cover the spaces D, substantially as described.

3. In a cabinet or cage of the kind described, the combination of a floor H and ceiling J, having hinged parts H' and J', posts K, gates A and L, one of the gates A being provided with an inner door A', provided with the mirrored shutters E and F, and a sliding bar N, substantially as described.

In witness whereof I have hereunto set my hand, at London, this 9th day of August, 1892, in the presence of two witnesses.

ADELAIDE MORRITT.

In presence of—
JAMES MILLER,
ALBERT EDWARD ELLEN.